(12) United States Patent
Graham (10) Patent No.: US 9,264,589 B2
(45) Date of Patent: Feb. 16, 2016

(54) CASE FOR MOBILE COMMUNICATIONS DEVICE

(71) Applicant: Andrew Graham, Arlington Heights, IL (US)

(72) Inventor: Andrew Graham, Arlington Heights, IL (US)

(*) Notice: Subject to any disclaimer, the term of this patent is extended or adjusted under 35 U.S.C. 154(b) by 138 days.

(21) Appl. No.: 13/942,479

(22) Filed: Jul. 15, 2013

(65) Prior Publication Data

US 2015/0015780 A1    Jan. 15, 2015

(51) Int. Cl.
*H04N 5/225* (2006.01)
*G02B 7/18* (2006.01)
*G02B 17/02* (2006.01)

(52) U.S. Cl.
CPC ........... *H04N 5/2252* (2013.01); *H04N 5/2254* (2013.01); *G02B 7/1805* (2013.01); *G02B 17/023* (2013.01)

(58) Field of Classification Search
CPC .... H04N 5/2252; G02B 17/56; G03B 17/563; G03B 13/01–13/009; F16M 13/00; H04M 1/0264

USPC ................................................ 348/373–375
See application file for complete search history.

(56) References Cited

U.S. PATENT DOCUMENTS

| | | |
|---|---|---|
| 2006/0276220 A1 | 12/2006 | Schure |
| 2011/0264554 A1 | 10/2011 | King |
| 2012/0018322 A1 | 1/2012 | Mongan et al. |
| 2012/0019920 A1 | 1/2012 | Mongan et al. |
| 2012/0055938 A1* | 3/2012 | Yoo ................................ 220/660 |
| 2012/0264491 A1 | 10/2012 | Singhal |
| 2014/0369575 A1* | 12/2014 | Riopka et al. ................. 382/127 |

* cited by examiner

*Primary Examiner* — Mekonnen Dagnew
(74) *Attorney, Agent, or Firm* — Leydig, Voit & Mayer Ltd.

(57) ABSTRACT

A case attachable to a mobile communications device such as a smart phone operatively equipped with a camera can accommodate an optical refractor. The optical refractor can be adapted to change the direction of light rays passing through it. The case can align a first optical surface of the optical refractor with the camera lens and can maintain a second optical surface in a non-parallel arrangement with the first optical surface. The optical refractor can redirect light rays from an unaligned object to the camera lens. In an aspect, the object may be a bar code label.

12 Claims, 7 Drawing Sheets

CASE FOR MOBILE COMMUNICATIONS DEVICE

BACKGROUND OF THE INVENTION

Mobile communications devices such as smart phones, PDAs and the like have become ubiquitous throughout modern society. In addition to often providing wireless communications connectivity such as via phone service and text messaging, these devices are generally configured as small computers including operating systems that can support an increasingly broad range of sophisticated computing applications and other software-related functionalities. The input-output interface between the device and a user can include a touch screen display and/or physical keypad. Many of these devices are often operatively equipped with a digital camera that can capture visual images that can be stored on the device or manipulated by the computer applications. The exterior design of these communications devices tends to be sleek and compact to facilitate the mobility aspect of the communications devices. The camera lens is typically disposed on the exterior of the communications device at a location where it will generally not interfere with the handling of the device. In addition to capturing visual images as digital photographs, the camera can in some instances be used as a reader or scanner to obtain information about an object that has been scanned, such as, for example, a barcode label. The present disclosure is directed to enabling similar functionality in a mobile communications device.

BRIEF SUMMARY OF THE INVENTION

The disclosure describes a device and method for facilitating or increasing the applications and use of a camera incorporated into a mobile communications device such as a smart phone. The device can include a cover, shell or case that can attach to a mobile communications device and can be configured to accommodate and mount an optical refractor to the device. An optical refractor can change the direction of light rays that pass through it. Accordingly, the case can align the optical refractor with respect to the camera lens operatively associated with the communications device. As a result, the focal direction of the camera lens can be altered through the optical refractor. The camera lens can thus capture the image of an object that is not aligned with the lens or is angularly positioned outside the range of view of the lens.

In a specific application, the case and optical refractor can reconfigure the communications device into a functional reader or scanner, such as may be used to read barcode labels. The communications device may include a touch screen display on one surface and a camera lens disposed on an opposite surface. However, in the particular embodiment, the optical refractor can redirect light rays approximately 90°. Accordingly, a user can point or direct the front or top edge of the communications device toward the barcode label or another object and the optical refractor can re-orientate the image 90° and direct the image to the camera lens. The image may be presented on the touch screen display for viewing by the user. However, the disclosure can be applied in other applications and is not limited to barcode reading.

A possible advantage of the disclosure is that the direction of focus of a camera lens on a mobile communications device can be altered so that the image of an object unaligned with the lens can be captured. Another possible advantage is that the disclosure can reconfigure the communications device in a manner that facilities its handling and use as a reader or scanner. These and other possible features and advantages of the disclosure will be apparent from the foregoing detailed description and the accompanying drawings.

DETAILED DESCRIPTION

Figure 1:
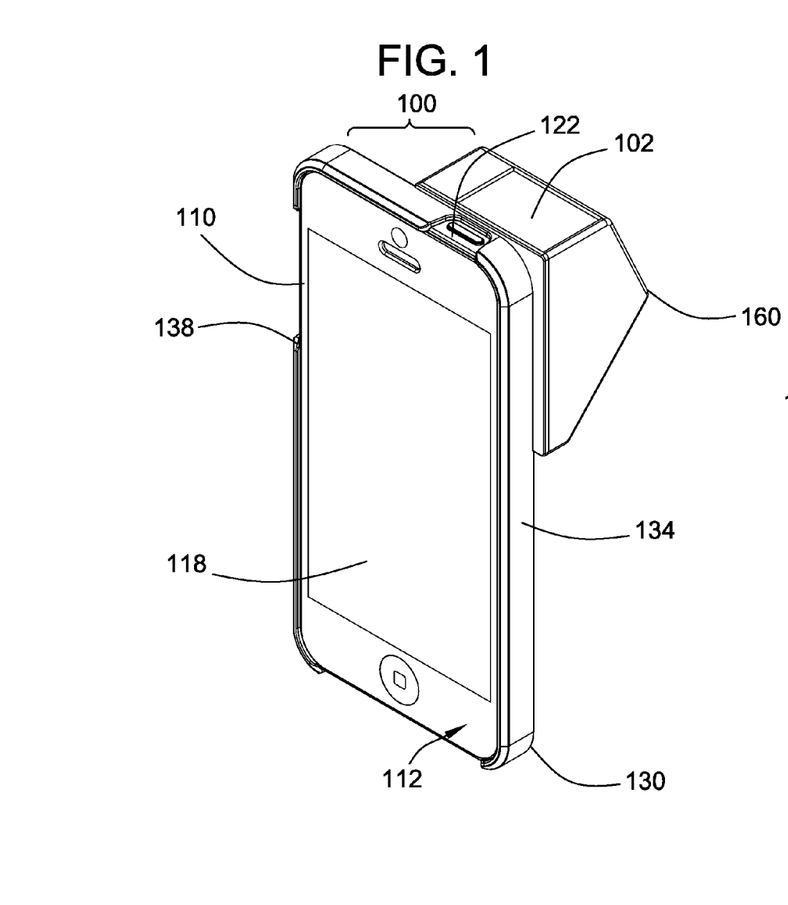
FIG. 1 is a front perspective view of a case attached to a communications device and configured to mount an optical refractor proximate a camera lens of the device.
Figure 2:
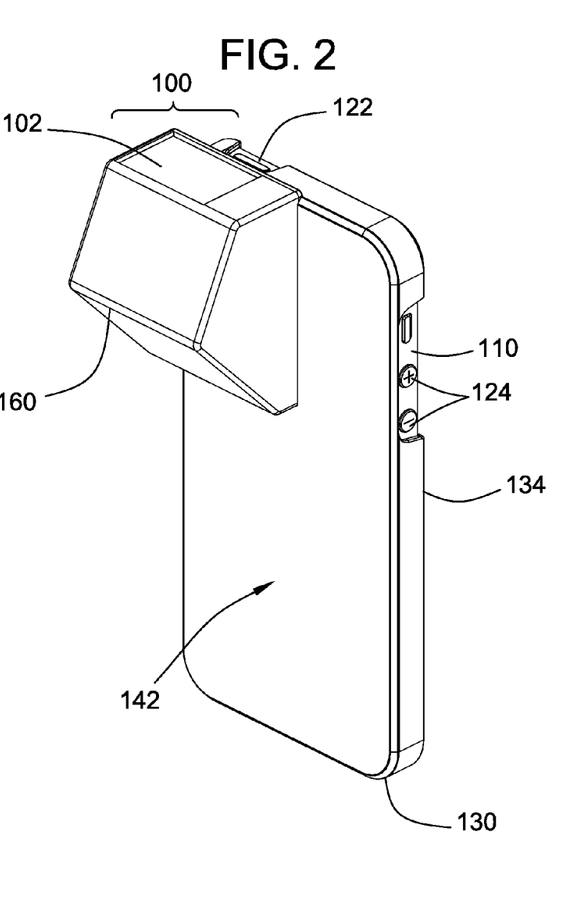
FIG. 2 is a rear perspective view of the case of FIG. 1 attached to the communications device.

Now referring to the drawings, wherein like reference numbers refer to like elements, there is illustrated in FIGS. 1 and 2 a cover, shell or case 100 for mounting and aligning an optical refractor 102 with a mobile communications device 110 such as a smart phone to which the case can be releasably attached. The case 100 and optical refractor 102 can realign the optical focus or sight line of a camera lens operatively associated with the communications device 110 to capture the visual image of an object that is otherwise unaligned with the lens. In addition to realigning visual images with respect to the camera lens, the case 100 may function to protect the communications device 110 from possible damage due to being dropped, thrown, etc., and accordingly the case can be made from any suitable material including, for example, a relatively rigid plastic or polycarbonate or a more pliable elastomer such as rubber.

Figure 3:
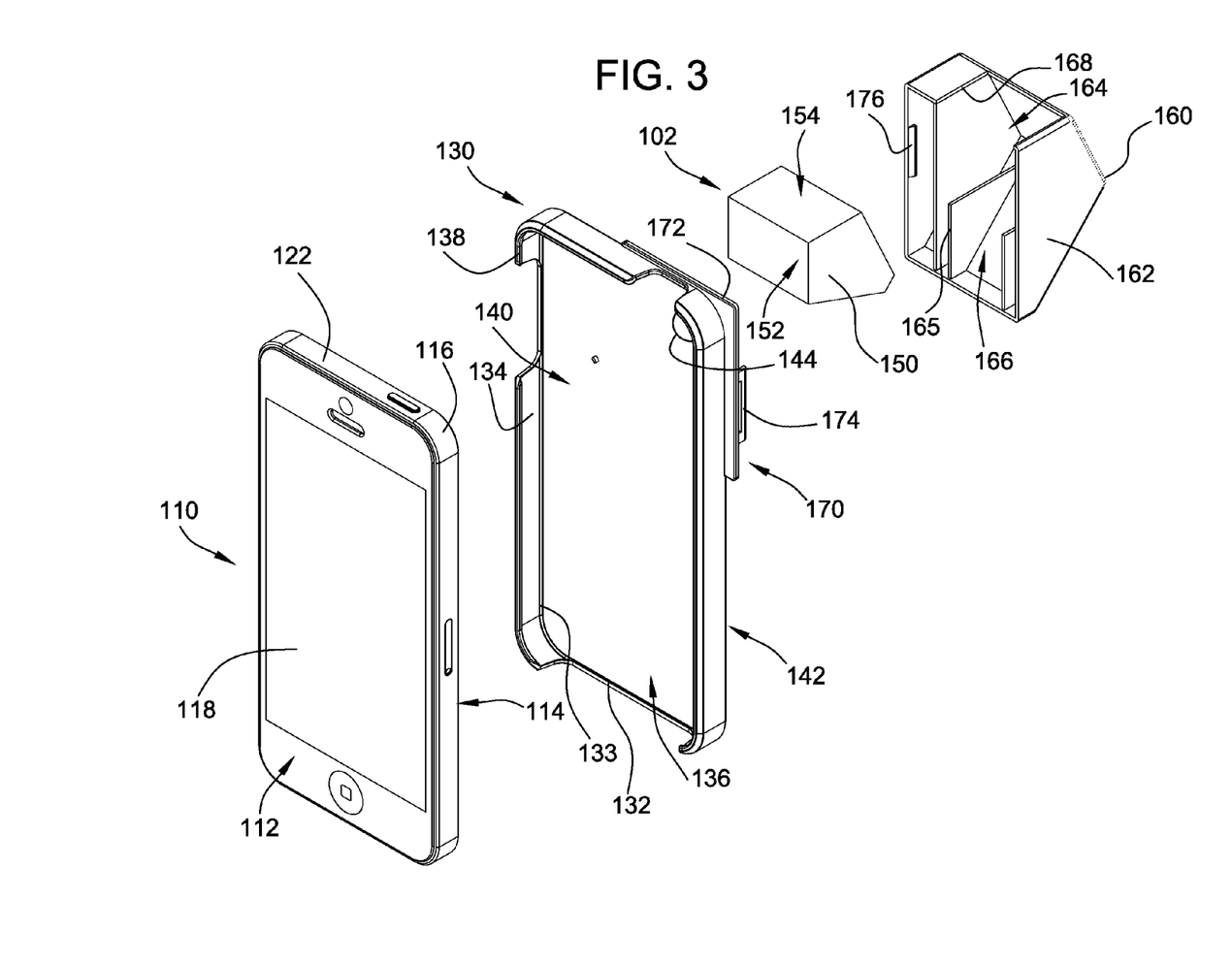
FIG. 3 is a front assembly view of the case detached from the communications device, the case including an attachment portion and a refractor housing for accommodating the optical refractor.
Figure 4:
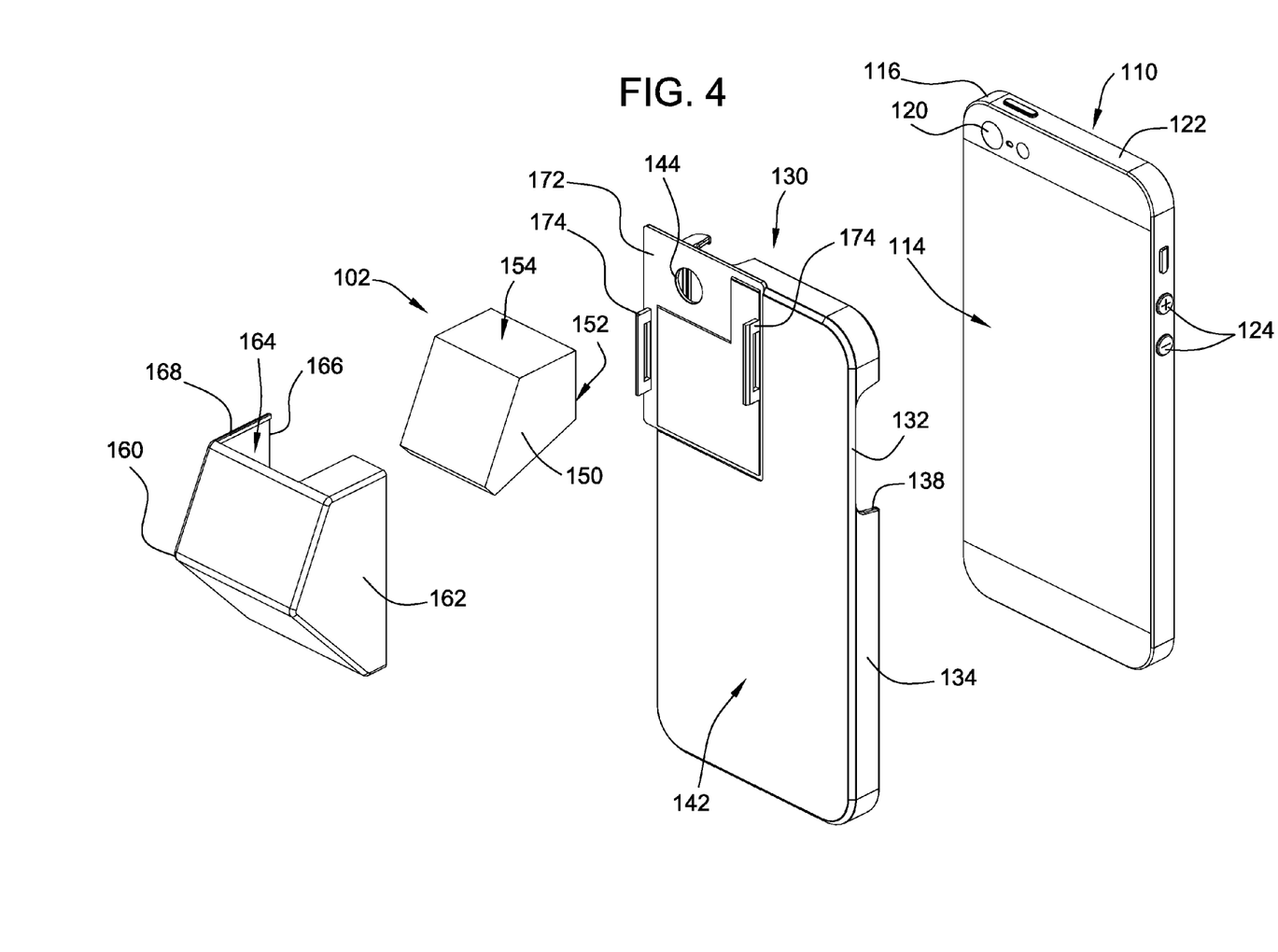
FIG. 4 is a rear assembly view of the case with a first aperture in the attachment portion to align the optical refractor with a camera lens of the device and a second aperture in the refractor housing to expose the refractor to incident light rays.

Referring to FIGS. 3 and 4, to contribute to the atheistic appearance and portability of the mobile communications device 110, the device itself may be generally flat and planar with a first major surface 112 and an opposing second major surface 114 defining a generally rectangular outline 116 of the device, though the present disclosure contemplates other shapes, sizes and configurations of mobile communications devices. To interact with a user, the first major surface 112 of the mobile communications device 110 can be configured as a touch screen display 118 and may include other buttons and/or a keypad. To use the communications device 110 as a camera, a camera lens 120 may be disposed on the opposite second major surface 114 of the device. In the illustrated embodiment, the camera lens 120 is located proximate the top edge 122 toward an upper corner of the second major surface 114 but, in other embodiments, can be located elsewhere. Accordingly, the focal direction of the camera lens 120 is directly away from and perpendicular to the second major surface 114. The communications device 110 may include one or more other buttons, dials, or ports 124 disposed about the rectangular outline 116 to facilitate operation of the device.

To releasably attach the case 100 to the mobile communications device 110, the case can include an attachment component 130. Referring to FIGS. 3 and 4, the attachment component 130 can be generally comparable in size and shape to the communications device 100 but, in other embodiments, may be different in shape. The attachment component 130 includes a planar panel 132 with a peripheral wall 134 extending about a peripheral edge 133 of the planar panel. The peripheral wall 134 may be perpendicular with respect to the panel 132 and thereby delineates a shallow recess 136 to receive the mobile communications device 110. The panel 132 can include an inner surface 140 intended to be placed adjacent, contiguous to, and/or facing the second major surface 114 of the communications device 110 when the attachment component 130 is attached and an outer surface 142 parallel to and opposite of the inner surface. The panel 132 and the peripheral wall 134 can be thin enough such that the attachment component 130 does not add substantial bulk to the mobile communications device or detract from the sleek, flat appearance of the device when the two items are attached together.

Figures 5, 6, 8, 9:
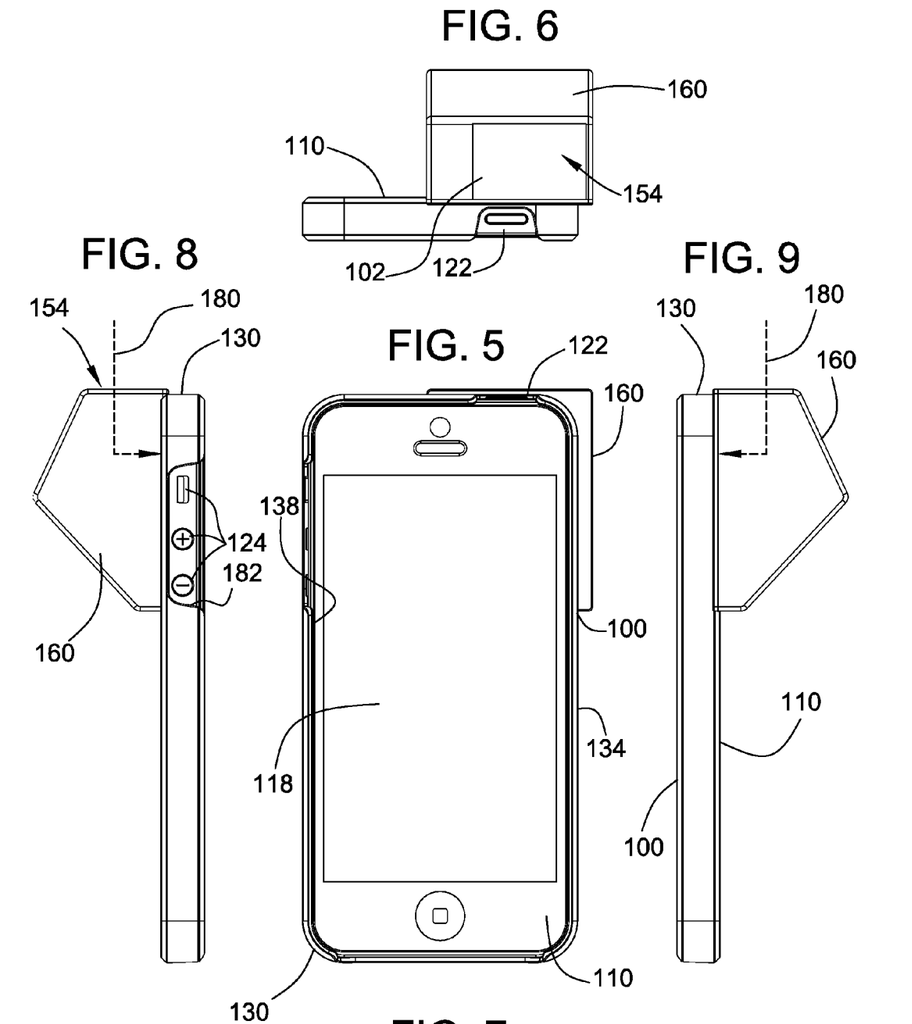
FIG. 5 is a front elevational view of the case attached to the communications device with the touch screen display exposed.
FIG. 6 is a top plan view of the case attached to the communications device including the second aperture oriented in the forward direction.
FIG. 8 is a left side elevational view of the case attached to the communications device.
FIG. 9 is a right side elevational view of the case attached to the communications device.
Figure 7:
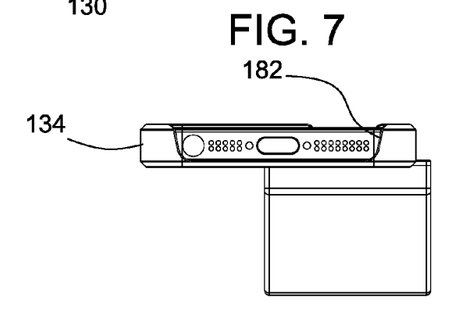
FIG. 7 is a bottom plan view of the case including a slot disposed in the peripheral wall.
Figure 10:
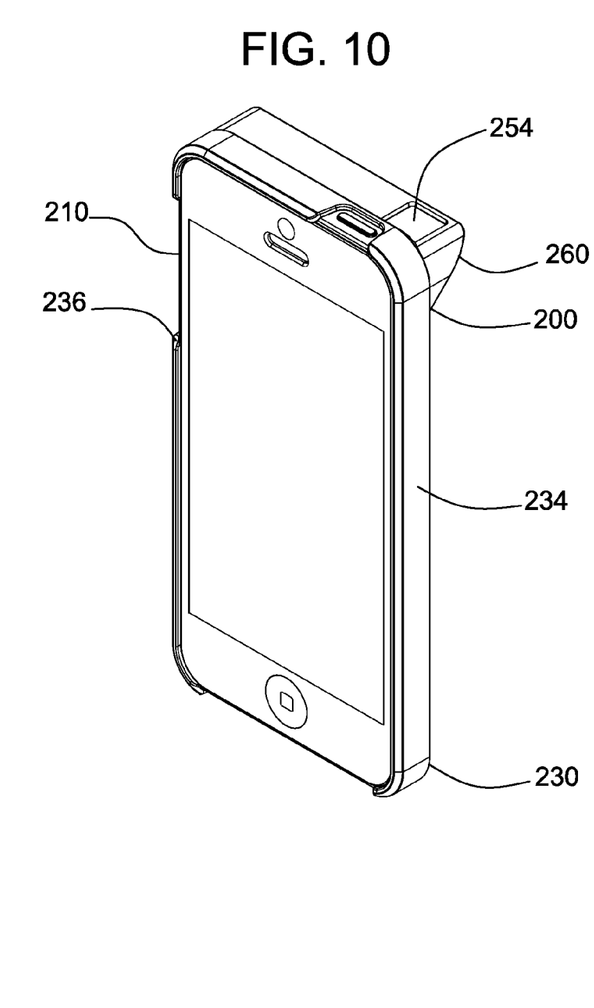
FIG. 10 is a front perspective view of another embodiment of a case attached to the communications device and configured to mount an optical refractor proximate the camera lens of the device.
Figure 11:
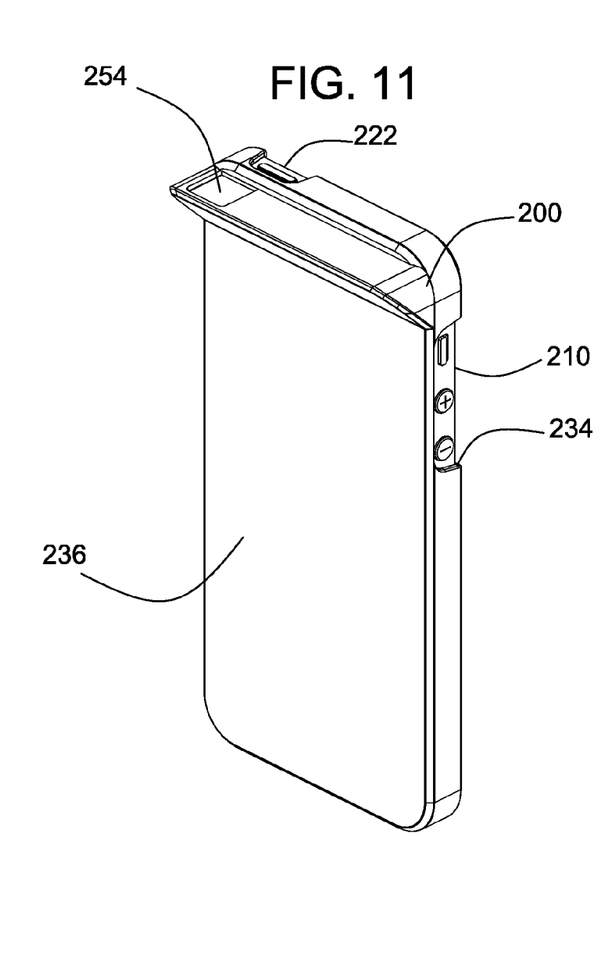
FIG. 11 is a rear perspective view of the case of FIG. 10 attached to the communications device.

To secure the attachment component 130 with the communications device 110, the distal edge of the peripheral wall 134 opposite where the wall connects to the panel 132 can be formed with a lip 138 having a slight inward curve into the recess 136. Referring to FIGS. 1 and 5, the inward curve of the lip 138 can extend slightly about and capture the outline 116 of the communications device 110. The attachment component 130 and the communications device 110 can thereby be held together in a snap-lock manner. While the illustrated embodiment illustrates that the peripheral wall 134 generally corresponds in shape to the rectangular outline 116 of the communications device 110 and therefore includes four edges, it will be appreciated that in other embodiments, the peripheral wall may have a different outline and may extend along only one, two or three sides of the communications device. In addition, in other embodiments, the attachment component 130 and the communications device 110 can attach by methods other than a snap-lock such as, for example, sliding the case partially or wholly around the device as a sleeve.

To provide access to the camera lens 120, a first aperture 144 can be disposed in the panel 132 from the inner surface 140 to the outer surface 142. The first aperture can have any suitable size and shape such as, for example, circular. In the illustrated embodiment, the first aperture 144 is located to correspond to the location of the camera lens 120 in the upper corner of the panel 134 but in other embodiments can be located in any other location to correspond to the camera lens. The first aperture 144 is focally aligned with the camera lens 120 so that the focus of the camera lens is still generally perpendicular with respect to the second major surface 114 of the communications device 110. In other embodiments, the corner portion of the attachment component proximate the camera lens can be cutaway rather than including an enclosed aperture.

To realign the optical focus of the camera lens 120, an optical refractor 102 can be mounted to the communications device 110 by the case 100. An optical refractor 102 can change the direction of light rays that pass through it. The materials, shape and/or coatings of the optical refractor can be selected to alter the normally linear path of a light ray incident upon the refractor by changing its angular direction, for example, through principles of optical geometry such as internal reflection, refraction and/or other optical principles. In the illustrated embodiment, the optical refractor 102 can be a non-dispersive prism and, in particular, a penta-prism 150 which is known to alter the path of an incident light ray by 90°, thereby bending or channeling the light ray through a right angle. However, in other embodiments of the disclosure, other angles of deviation are contemplated. The penta-prism 150 can be made of a generally transparent material such as glass or transparent plastic and can have a five-sided outline including at least a first optical surface 152 and a second optical surface 154. When light enters the penta-prism through one surface, the angles and orientations of the five sides reflect the light ray internally so that it emits from a different surface. By way of example only, the first optical surface 152 can be designated the surface that the altered or refracted light ray emits from the refractor and the second optical surface 154 can be designated the surface which a traveling light ray or beam will be incident upon the refractor. To deviate the angle of the light ray, the first optical surface 152 and the second optical surface 154 are not parallel to each other and, in the illustrated embodiment, can be oriented at a 90° or right angle to each other.

Accordingly, to align the optical refractor 102 with the camera lens 120 to direct the refracted light ray to the camera, the case 100 can include a refractor housing 160 that is mountable to the outer surface 142 of the attachment component 130. The refractor housing 160 can be a generally hollow structure with housing walls 162 or surfaces delineating an internal cavity 164 spaced to accommodate the optical refractor 102. With respect to the illustrated embodiment utilizing a penta-prism 150, the internal cavity 164 can have a shape corresponding to the prism with at least one open side 166 to expose the first optical surface 152 to the camera lens 120 through the first aperture 144. One or more internal ribs 165 can extend from the inside of the housing walls 162 to shift or position the first optical surface 152 to at least partially face the camera lens 120.

The refractor housing 160 can be made from the same or different materials as the attachment component 130 such as, for example, a molded, rigid plastic. Because such materials may be opaque, the refractor housing 160 can include a second aperture 168 disposed in one of the housing walls 162 to expose the second optical surface 154 of the penta-prism 150 to the environment and enable an incident light ray projecting from an external object to access the optical refractor 102. The size and/or shape of the second aperture 168 can be coextensive with the size of the second optical surface 154 or it can be smaller than the second optical surface. In an embodiment, a transparent material can be disposed in the second aperture 168 to function similar to a window pane. In an embodiment, the internal cavity 164 can be configured to position the second optical surface 154 generally flush with the second aperture 168. Accordingly, in the illustrated embodiment, the second aperture 168 and the open side 166 can be oriented at right angles with respect to each other but, as indicated above, other angles are contemplated.

Referring to FIGS. 3 and 4, to mount the refractor housing 160 accommodating the optical refractor 102 to the attachment component 130, the two components can be configured with a suitable mounting mechanism 170. For example, in the illustrated embodiment, the mounting mechanism 170 can include a mounting pad 172 formed on the attachment component 130 generally about the same upper corner as the first aperture 144 on which the optical refractor 102 can be supported. Extending perpendicularly from the mounting pad 172 can be one or more elongated rails 174 each with an enclosed slot 176 disposed lengthwise through it. Formed on the refractor housing 160 and protruding internally from the housing walls 162 can be a corresponding number of respectively shaped and sized, tapered bosses 176. When the refractor housing 160 is positioned over and moved toward the mounting pad 172, the tapered bosses 176 can slide past and displace the rails 174 until the bosses 176 snap into the enclosed slots 174. The mounting mechanism 170 thereby secures the refractor housing 160 with the attachment component 130 in a snap-lock manner that aligns the first optical surface 152 with the first aperture 144. In other embodiments, however, other suitable mounting mechanisms or mounting methods are contemplated such as other interlocking structures, tongue-and-groove connections, fasteners, adhesives, ultrasonic welding, and the like. Furthermore, the attachment component 130 and the refractor housing 160 can be formed integrally with each other and can be made to accommodate the optical refractor by, for example, articulating the refractor housing with respect to the attachment component via a living hinge or press-fitting the refractor into the second aperture 168.

Referring to FIGS. 5-9, when the case 100 with the optical refractor 102 is attached to the communications device 110, the combination can be used to alter the direction of focus of the camera lens. In the illustrated embodiment, the refractor housing 160 is disposed at an upper corner of the case 100 corresponding to the location of the camera lens with the refractor housing 160 accommodating approximately half the width of the case. In FIGS. 5-9, the camera lens is covered by the attached case, however, the optical reflector 102 will enable the communications device 110 to capture images including those from directions that are unaligned with the lens. Substantially the remainder of the attached communications device 110 and case 100 remains generally ergonomically flat and can be easily grasped and manipulated by a user's hand.

The top edge 122 of the communications device 110, corresponding to the plane of the second optical surface 154 of the optical refractor 102, can be directed toward an object to be imaged such as a barcode label. Light rays representing an image of the object and indicated in dashed lines 180 may fall incident on the second optical surface 154 oriented toward the object. The optical refractor 102 refracts the light rays 180 approximately 90° and directs the light rays toward the camera lens. The communications device 110 can present the image upon the touch screen display 118, hence, the image can be reproduced 90° from the direction in which the object is located. This may allow for simultaneous scanning and viewing of an object. In those embodiments in which the image is of a barcode, the communications device 110 can process the barcode and the touch screen display 180 can present additional information represented by the barcode, such as price, item, quantity, etc., which can also be stored in the memory of the device for later processing. Thus, the communications device 110 can be handled and used in a manner similar to a traditional barcode reader. In various embodiments, to provide access to the buttons, dials, or ports 124 disposed about the outline 116 of the communications device 110, the slots 182 disposed through the peripheral wall 134 of the case can align with the buttons, dials, or port.

Referring to FIGS. 10-13, there is illustrated another embodiment of the case 200 attachable to a mobile communications device 210 to mount an optical refractor 202 in a usable position on the device. The communications device 210 can be similar to the one depicted in FIGS. 1-4 and will not be described in further detail. As in the prior embodiment, the case 200 can include an attachment component 230 and a refractor housing 260. To releasably attach the case 200 to the communications device 210, the attachment component 230 can include a panel 232 having an inner surface 240 and an opposite outer surface 242 with a peripheral wall 234 extending from the panel that terminates at an inward protruding lip 238. When the component 230 and the device 210 are pressed together, the peripheral wall 234 and lip 238 can move over and around the outline of the device to secure the two together. A first aperture 244 can be disposed through the panel 232 at a location aligned with the camera lens on the communications device.

Figure 12:
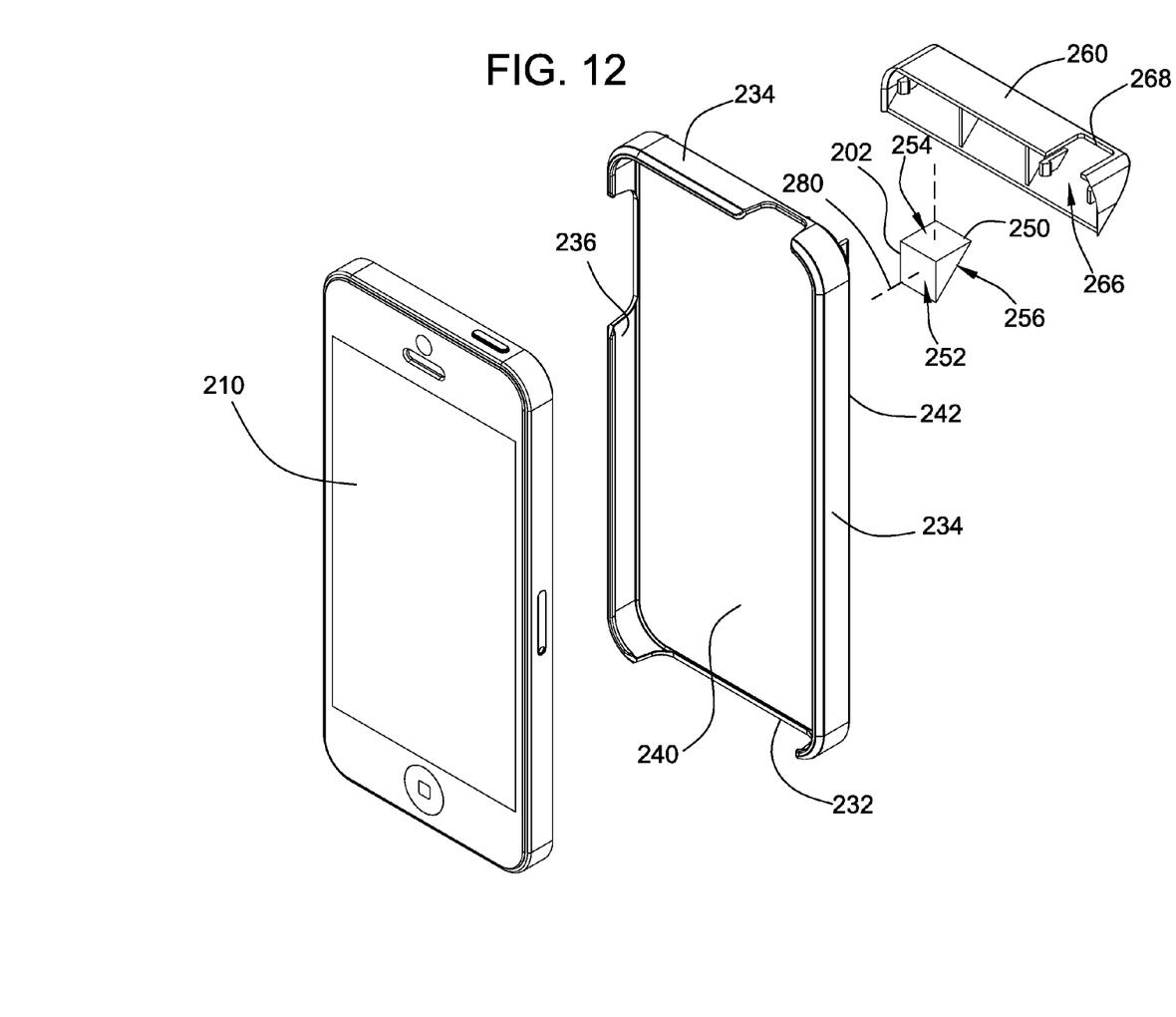
FIG. 12 is a front assembly view of the case detached from the communications device, the case including an attachment portion and a refractor housing for accommodating an optical refractor.

In the second embodiment, the optical refractor 202 can be shaped differently and, in particular, can be shaped as a three-sided right triangle 250 with a first optical surface 252, a second optical surface 254 perpendicular to the first optical surface, and a third optical surface 256 corresponding to the hypotenuse between the first and second optical surfaces. The right triangle 250 can be made from any suitable, generally transparent material. Referring to FIG. 12, an incidental light ray 280 traveling perpendicular to the second optical surface 254 can traverse the triangle 250 to the third optical surface 256 that deflects the light ray approximately 90° such that the light ray is directed out the first optical surface 252. To facilitate redirection, the third optical surface 256 can be coated with a reflective film or material. Of course, to redirect light at angles other than 90°, the optical refractor can have different angles, lengths, shapes, etc. to produce a different optical geometry. Further, in other embodiments, the optical refractor can be designed differently than a prism or glass triangle and, for example, can be designed as a mirror or series of mirrors or an optical fiber.

Figure 13:
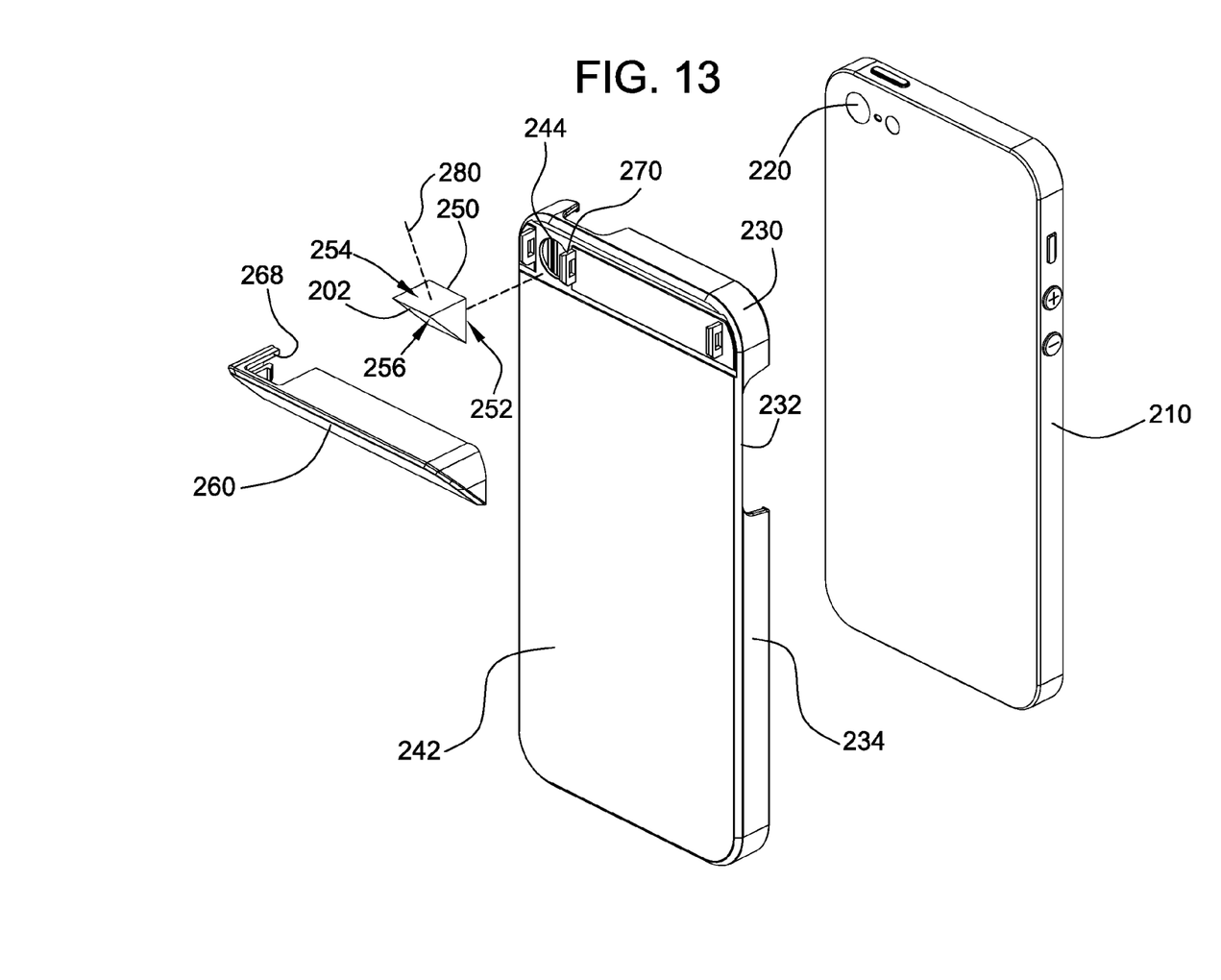
FIG. 13 is a rear assembly view of the case with a first aperture in the attachment portion to align the optical refractor with a camera lens of the device and a second aperture in the refractor housing to expose the refractor to incident light rays.

To mount and align the optical refractor 202 with the camera lens 220 of the communications device 210, the refractor housing 250 can have a triangular shape generally corresponding to the shape of the refractor and delineating an internal cavity 266 for accommodating the refractor. To enable light transmission through the optical refractor 202 and the refractor housing 260, the housing can include an open side 266 and a second aperture 268, perpendicular to each other, that can frame or outline the respective first optical surface 252 and the second optical surface 254. The refractor housing 260 can mount to the outer surface 242 of the attachment device 230 by a mounting mechanism 270 such as a snap-lock mechanism. The design of the mounting mechanism 270 can be configured so that the refractor housing 260 positions the first optical surface 252 adjacent to the camera lens 220 so that the redirected light rays are transmitted to the lens.

A possible advantage of utilizing a right triangle 250 as the optical refractor 202 is that the size and/or shape of the refractor and correspondingly of the refractor housing 260 can be reduced in comparison with the penta-prism. Accordingly, the case 200 and communications device 210 can further maintain their sleek design and ergonomic characteristics. In the illustrated embodiment, the refractor housing 260 can be generally coextensive with the dimensions of the top edge 222 of the communications device 210. This may provide the case/device combination with greater surface area to place the device against an object to be scanned. In other embodiments, the refractor housing can have other shapes and features to facilitate use of the communications device as a scanner, reader or other optical equipment.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A case for a mobile communications device comprising:
    an attachment component for releasable attachment with the mobile communications device, the attachment component including a panel having a first aperture alignable over a camera lens located proximate a top edge of the mobile communications device and a peripheral wall extending generally perpendicularly from a peripheral edge of the panel to releasably secure the panel adjacent a second major surface of the mobile communication device opposing a first major surface with a touch screen display;
    a refractor housing for accommodating and mounting a single optical refractor to the attachment component, the refractor housing including a second aperture oriented in a 90° alignment with the first aperture in the panel of the attachment component and alignable coplanar with the top edge of the mobile communications device; and
    an optical refractor for refracting light 90° between the first aperture and the second aperture, the optical refractor having a first optical surface and a second optical surface arranged at 90° to each other, the first optical surface oriented with the first aperture coplanar to the top edge of the mobile communications device and adapted to receive incident light from perpendicular to the top edge and the second optical surface oriented parallel to the second aperture over the camera lens to emit refracted light toward the camera lens.

2. The case of claim 1, where optical refractor is a prism including a first optical surface and a non-parallel second optical surface.

3. The case of claim 1, wherein the panel is generally planar and includes an inner surface adapted to placed adjacent a major surface of the mobile communications device and an opposite outer surface.

4. The case of claim 3, wherein the peripheral wall generally corresponds in shape to an outline of the mobile communications device.

5. The case of claim 4, wherein the prism housing attaches to the attachment component via a mounting mechanism disposed in part on an outer surface of the panel.

6. The case of claim 5, wherein the mounting mechanism is a snap-lock mechanism.

7. The case of claim 1, wherein the case is made of opaque plastic.

8. A method of capturing an image with a mobile communications device, the method comprising:
    attaching a case to the mobile communications device adjacent to a second major surface of the mobile communication device opposing a first major surface having a touch screen display, the case including a first aperture aligned with a camera lens located proximate a top edge of the mobile communications device on the second major surface;
    mounting a single optical refractor to the case, the optical refractor including a first refractor surface and a second refractor surface arranged at 90° to each other, the first refractor surface generally facing the first aperture over the camera lens, and the second refractor surface oriented coplanar with the top edge of the mobile communication device;
    mounting a refractor housing accommodating the single optical refractor to the case, the refractor housing aligning the first refractor surface with the camera lens and including a second aperture co-planar with the top edge of the mobile communications device, the first and second apertures being aligned at an approximate right angle to each other;
    refracting an image oriented perpendicular to the top edge of the mobile communication device from the second refractor surface 90° to the first refractor surface; and
    directing the image from the first surface through the first aperture to the camera lens.

9. The method of claim 8, wherein the optical refractor is a penta-prism adapted to refract light approximately 90°.

10. The method of claim 8, wherein the optical refractor is a three-sided right triangle adapted to refract light approximately 90°.

11. The method of claim 8, wherein the refractor housing mounts to the attachment component via a snap-lock mechanism.

12. The method of claim 8, wherein the object projecting the image is a barcode.

\* \* \* \* \*